United States Patent [19]

Moran

[11] Patent Number: 5,536,347
[45] Date of Patent: Jul. 16, 1996

[54] NO AUTOCLAVE PROCESS FOR FORMING A SAFETY GLASS LAMINATE

[75] Inventor: James R. Moran, Longmeadow, Mass.

[73] Assignee: Monsanto Company, St. Louis, Mo.

[21] Appl. No.: 310,296

[22] Filed: Sep. 22, 1994

[51] Int. Cl.$^6$ .............................. B32B 31/20; B32B 17/10
[52] U.S. Cl. .......................... 156/103; 156/104; 156/105; 156/106
[58] Field of Search ..................... 156/103, 104, 156/105, 106; 428/437

[56] References Cited

U.S. PATENT DOCUMENTS

| | | | |
|---|---|---|---|
| 3,234,062 | 2/1966 | Morris | 156/104 |
| 3,852,136 | 12/1974 | Plumat et al. | 156/103 |
| 3,855,055 | 12/1974 | Kanno et al. | 428/437 |
| 4,161,565 | 7/1979 | Hermann et al. | 428/437 |
| 4,398,979 | 8/1983 | Cathers et al. | 156/87 |
| 4,452,840 | 6/1984 | Sato et al. | 428/156 |
| 4,647,237 | 3/1987 | Rase | 156/103 X |

*Primary Examiner*—Michael W. Ball
*Assistant Examiner*—Francis J. Lorin
*Attorney, Agent, or Firm*—Michael J. Murphy

[57] ABSTRACT

A no autoclave process for forming a safety laminate which involves interposing a plasticized polyvinyl butyral sheet having a water content of 0.2 weight percent or more between a pair of glass layers to form a laminate assembly, enclosing at least the edges of the assembly in a sealed space, subjecting the sealed space to vacuum to deair the laminate assembly, heating the deaired laminate assembly to a temperature sufficient to seal the edges of the glass layers and plasticized polyvinyl butyral sheet and then subjecting the laminate assembly to a temperature and for a time sufficient to bond the glass layers to the sheet while reducing the vacuum to an extent effective to counteract water bubble formation in the sheet to form a safety laminate meeting the American National Standards Code for Safety Glazing Materials.

3 Claims, 1 Drawing Sheet

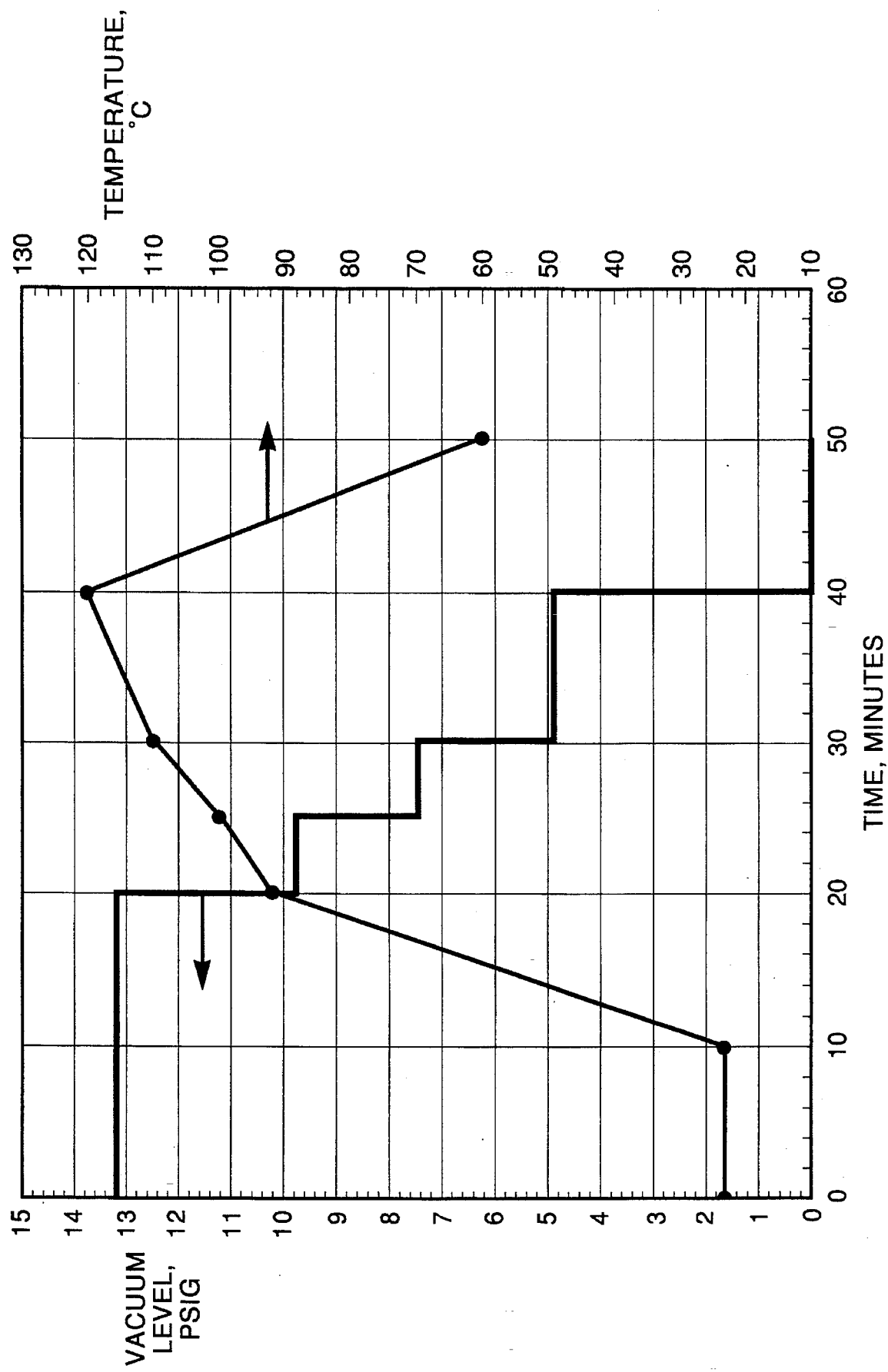

NO AUTOCLAVE PROCESS FOR FORMING A SAFETY GLASS LAMINATE

BACKGROUND OF THE INVENTION

This invention relates to safety glass and more particularly to improvements in a laminating process for preparing safety glass.

Safety glass using plasticized polyvinyl butyral sheet (hereinafter "PVB sheet") is very widely used in windows. The PVB sheet is laminated between inner and outer panes of transparent glass and functions to absorb energy, such as caused by a blow from an object, without penetration of the glass thus providing safety to occupants of the surrounding area.

Safety glass is usually formed by subjecting the assembly to elevated temperature and pressure in an autoclave to bond the components. In the autoclave the components are heated in a chamber filled with oil or air to about 120° to 150° C. at a pressure of 10 to 15 $kg/cm^2$ to soften and fluidize the PVB sheet to cause it to adhere intimately to the glass panes. Needless to say, autoclave bonding processes require great capital investment and labor which add cost to the finished safety glass laminate.

It is also less widely known to prepare safety glass by a process not using an autoclave (hereinafter "no autoclave process(es)"). As used herein, "no autoclave process(es)" means forming a laminate of glass and PVB sheet without using an autoclave environment wherein superatmospheric pressure on the order of about 10 to 15 $kg/cm^2$ is present to bond the layers. A typical no autoclave process is described in U.S. Pat. No. 3,234,062, issued Feb. 8, 1966.

A continuing need exists in the art to improve industrially valuable no autoclave processes.

SUMMARY OF THE INVENTION

Now improvements have been made in no autoclave processes.

Accordingly, a principal object of this invention is to provide process improvements simplifying no autoclave processes.

Other objects of this invention will in part be obvious and will in part appear from the following description and claims.

These and other objects are accomplished by providing a no autoclave process for forming a safety laminate comprising: a) interposing a plasticized polyvinyl butyral sheet having a water content of more than 0.2 weight percent between a pair of glass layers to form a laminate assembly; b) enclosing at least the edges of the assembly in a sealed space; c) subjecting the sealed space to vacuum to deair the laminate assembly; d) heating the deaired laminate assembly to a temperature sufficient to seal the edges of the glass layers and plasticized polyvinyl butyral sheet; and then e) subjecting the laminate assembly to a temperature and for a time sufficient to bond the glass layers to the sheet while reducing the vacuum to an extent effective to counteract water bubble formation in the sheet to form a safety laminate meeting the American National Standards Code for Safety Glazing Materials Z26.1-1990.

Also provided in a no autoclave process for forming a safety laminate of two glass layers spacially separated by and bonded to a plasticized polyvinyl butyral sheet is the step of reducing or discontinuing vacuum after edge sealing of the plasticized polyvinyl butyral sheet to the glass layers to substantially avoid formation of bubbles in the sheet. A preferred PVB sheet has a surface roughness pattern of the type disclosed in commonly assigned, copending U.S. application Ser. No. 08/185,348, filed Jan. 24, 1994, titled Rough-Surfaced Interlayer.

BRIEF DESCRIPTION OF THE DRAWING

In describing the overall invention, reference will be made to the accompanying drawing which is a time-temperature-pressure cycle plot of representative process conditions used in the invention.

DETAILED DISCUSSION

In the no autoclave process of the invention, the pressure, temperature, time cycle is controlled to facilitate use of commercially available PVB sheet — i.e. which is not initially conditioned to reduce moisture below a threshold level. More particularly, PVB sheet should contain some moisture to assist in developing the desired adhesion of the sheet to the glass in the final laminate. Toward this end, commercial PVB sheet is usually provided by the supplier with a water content of greater than 0.2 wt. % (based on the weight of the sheet), typically 0.3 to 0.6%. During initial assembly of the sheet and glass the temperature and humidity of the environment are controlled at levels chosen to preserve the same water content in the sheet as coming from the supplier. On the other hand, visible bubbles in the finished laminate from moisture in the sheet are undesirable optical defects to be avoided. In conventional autoclave laminating typically imposing superatmospheric pressure of 10 to 15 $kg/cm^2$ on the assembly being laminated, creation of visual moisture bubbles are not of great concern since the pressure keeps the water in the sheet and prevents it from migrating to the surface and nucleating into bubbles. Superatmospheric pressure is unavailable in no autoclave processes and bubbles, usually adjacent the edge, have historically been a problem. Reducing water content too low can increase adhesion too much thereby adversely affecting impact performance of the finished laminate. The no autoclave process of this invention avoids bubbles without initially conditioning the sheet to reduce water content below 0.2% by adjusting the vacuum profile during heating after the edges of the PVB sheet have been bonded to the glass.

In the present no autoclave process PVB sheet having a water content greater than 0.2 wt. % typically about 0.4 to 0.6 wt. %, is interposed between a pair of transparent glass layers to form an assembly to be laminated. Plasticized PVB sheet for laminated safety glass is commercially available from Monsanto Company as Saflex® sheet and E. I. duPont deNemours & Co. as Butacite® PVB resin sheeting. Sheet thickness is nominally 0.25 to 1.5 mm, preferably about 0.32 to 0.76 mm. The plastic of the sheet typically contains about 10 to 30 wt. % hydroxyl groups expressed as polyvinyl alcohol, about 0 to 2.5 wt. % acetate groups expressed as polyvinyl acetate with the balance being butyral expressed as polyvinyl butyral. Plasticizer content is about 20 to 40 parts per 100 parts of plastic. Such commercial PVB sheet will have a geometrically regular or irregular (random) pattern of deairing grooves on both its surfaces defined by minute collapsible projections. As long as present, the form of this pattern is non-critical. U.S. Pat. No. 4,452,840, issued Jun. 5, 1984 describes and depicts (FIGS. 1 and 2) regular and random patterns, the content of which is incorporated herein by reference. During deairing, air at the interface with a glass layer is conventionally channeled through these grooves out through the periphery of the assembly. The projections are an integral part of the PVB sheet which melt and collapse during heating after air removal providing a clear, smooth, void-free plastic surface bonded to the abutting transparent glass layer.

With an irregular or random sheet surface pattern it may be necessary to initially chill the sheet from room temperature (about 23° C.) to about 10° C. This increases the modulus of the PVB of the sheet to avoid premature collapse of the projections before substantially all air is removed. With a regular roughness pattern of grooves and projections, such as disclosed in the aforementioned commonly owned, copending application, such initial cooling, though optional, may be unnecessary.

After assembling the unlaminated glass/PVB sheet/glass components, at least the edges of such assembly are enclosed in a sealed space. One way to accomplish this is to insert the assembly in a flexible rubber bag having a port communicating with a vacuum source. Alternatively, and desirably because of simplicity, a ring in communication with such vacuum source is sealingly applied around the edges only of the assembly. When using a vacuum bag, a breather layer is advantageously used between the flexible bag and the laminate assembly enclosed therein. Such breather layer resists the flexible bag being prematurely tightly drawn down around the edges of the enclosed assembly when vacuum is imposed on the interior of the bag before all air from inside is evacuated. When such premature collapse occurs, pockets of air can be trapped between the glass and plastic components of the laminate leading to optical defects in the finished laminate. An appropriate breather layer is disclosed in U.S. Pat. No. 5,129,813, issued Jul. 14, 1992, the content of which is incorporated herein by reference. The breather layer therein described is a flexible plastic bag per se having a three dimensional pattern embossed in its surface defining interconnected channels through which air moves during evacuation of the bag. The channels communicate with the vacuum source and remain open and gradually collapse only when all air has been removed.

When sheet chilling described above is elected, the entire assembly of either vacuum bag and enclosed unlaminated components or vacuum ring on the edges of such components is exposed to reduced temperature.

After enclosing the edges in a sealed space, vacuum is drawn on the sealed space to remove air therefrom and deair the laminate assembly. Maximum vacuum as close as practical to zero absolute pressure is preferable to maximize air removal since superatmospheric pressure is unavailable to assist in dissolving residual air in the sheet during bonding to the glass. The assembly is subjected to this vacuum without heating over a brief period during which the rough surface on the PVB sheet is intact to facilitate air removal. This period varies with the design of the system used and is typically about 2 to about 15 minutes. The absence of heat during this phase avoids premature sealing of the sheet to the glass during air removal.

After such brief period, the laminate assembly while maintaining vacuum is gradually heated to a temperature sufficient to seal the edges of the glass layers to the encapsulated PVB layer. This occurs at about 85° to about 95° C. and happens about 20 minutes into the cycle in the embodiment encompassed by the plot displayed in the drawing. Then the temperature of the assembly is further increased while gradually reducing the vacuum. This reduction importantly counteracts the temperature-vacuum driving force tending to nucleate and grow bubbles in tile sheet at the edge of the assembly. As shown in the drawing, at a laminate assembly temperature of about 95° C., vacuum has been reduced from 13.2 to 9.8 psig and is then progressively further reduced in timed relation to a continuing increase in temperature until eliminated (40 minute point in the drawing) on reaching atmospheric pressure. Instead of a stepwise reduction, the vacuum alternatively can be completely eliminated when the laminate assembly reaches the 85° to 95° C. edge sealing temperature. Gradual reduction of vacuum is preferred to promote good compliance of the plastic and glass surfaces and avoid defects related to mismatch of the glass layers.

The temperature of the assembly being laminated is then increased further to a level (about 120°–135° C.) and maintained for a time sufficient to cause viscous flow of the PVB thereby fully collapsing the rough surface of the sheet and tightly bonding the confronting faces of the glass and sheet to form the finished safety laminate.

The various temperatures and periods of exposure described above are most conveniently provided by apparatus which includes a conveyor for the layers being laminated arranged to sequentially pass through zones maintained at the desired temperatures. The vacuum and temperature profile may vary from that shown in the drawing depending, for example, on the water content of the initial PVB sheet. The quality of the safety laminate formed by the no autoclave process just described meets the American National Standards Code for Safety Glazing Materials Z26.1-1990 without requiring additional treatment at superatmospheric pressure.

The invention is further described with reference to the following Examples which are not intended to limit or restrict the invention. Unless otherwise indicated, all quantities are expressed in weight.

EXAMPLE 1

Saflex® sheet is obtained from Monsanto Company which on each side has a regular roughness pattern of the type shown in FIG. 8 and described in commonly assigned copending U.S. application Ser. No. 08/185,348, filed Jan. 24, 1994, entitled Rough-Surfaced Interlayer. Projections height of this pattern above the plane of the sheet ($R_z$) is about 40 microns and pitch (space between adjacent rows of projections) is 415 microns. The sheet contains 0.45% water. 18×30 inch (46×76 cm) sections 30 mils (0.76 mm) thick at room temperature (72° F.) are disposed between two layers of similarly dimensioned glass to form an assembly to be laminated. Excess sheet overhanging the edges is trimmed off. A vacuum deairing ring at room temperature is manually applied around the peripheral edges of the laminate assembly and placed in communication with a vacuum source. Such ring is in the form of a molded flexible rubber tube forming a chamber along its length which is C-shaped in cross section. The ends defining the opening of the C-shape overlap the opposite outer surfaces of the assembly with the main body of the tube spaced from the marginal edge of the assembly forming the sealed evacuation chamber. Vacuum is drawn on the laminate assembly through the ring for about ten minutes. Then while maintaining the initially applied level of vacuum, the assembly is placed in a hot air oven and rapidly increased in temperature over about 10 minutes to about 92° C. The oven set point is positioned to further increase the temperature generally as shown in the drawing.

At 92° C., the vacuum is reduced to 9.8 psig and subsequently reduced further according to the vacuum-temperature profile shown in the drawing. When the laminate temperature reaches about 120° C., the assembly is removed from the oven and vacuum terminated. The vacuum ring is removed and the laminate allowed to drop to about room temperature. Visual examination of finished laminates show no visible bubbles or any other visual defects (including optical distortion) either locally adjacent or inward of the edges.

Using a near infra red spectrophotometer, PVB sheet moisture content in the finished laminates is measured as 0.45% — the same as in the unlaminated sheet. To determine whether any residual rough surface remains in the laminated sheet at the glass — PVB interfaces, the laminates are placed between a pair of cross polarized plastic films with a light source positioned below. The safety glass laminate is examined from above for any visible haze which would represent residual rough surface. No visible haze is observed. Values of between 4 to 7 are obtained when the pummel adhesion test is run on the finished laminates, 3 to 7 being the optimum level for good laminate integrity and impact strength. For the 4 to 7 pummel adhesion range measured, using a mathematical model, impact strength of the laminates as Mean Break Height (MBH) is calculated to be 17 to 22.3 ft (5.2 to 6.8 m). A 12×12 in (30.5×30.5 cm) section of finished laminate is immersed in boiling water for two hours and then visually examined for bubble formation in the PVB sheet component. None are seen. Pummel Adhesion and Mean Break Height are further described in U.S. Pat. No. 5,246,764, issued Sep. 21, 1993, col. 8, line 55 through col. 9, line 21, the content of which is incorporated herein by reference.

EXAMPLE 2

This Example uses a vacuum bag deairing system.

The assembly to be laminated (as in Example 1) at room temperature is entirely wrapped in a breather layer in the form of non-woven polyester fabric commercially available as Airweave N10 from Airtech International Inc., Carson, Calif. This material is rated to allow about 2500 cc per min of air to flow at 400° F. (204° C.) at pressures up to 100 psi (389 kPa). The wrapped assembly is inserted in a vacuum bag in the form of an elastomeric (i.e. silicone rubber) envelope and the laminating cycle of Example 1 repeated except that the time intervals to reach the temperatures noted are a little longer because of the greater mass being heated. Property testing of the finished laminates provide results equivalent to those in Example 1.

EXAMPLE 3

This Example uses initially chilled PVB sheet having a random rough surface pattern.

The procedure of Example 1 is repeated using PVB sheet with a random rough surface pattern on each side ($R_z$=33 microns, pitch =430 microns-average of both sides). The sheet sections are initially cooled to about 50° F. (10° C.) and kept at this temperature through the application of vacuum for deairing. The deaired laminates are then placed in the oven and treated as in Example 1.

Results on finished laminate quality are equivalent to those in Example 1.

EXAMPLE C1

This comparative example duplicates Example 1 of U.S. Pat. No. 3,234,062.

Commercial Saflex sheet having a random rough surface as described above in Example 3 is preconditioned to a moisture content of 0.2%. Using a molded rubber tubing as a vacuum ring the assembly being laminated was evacuated for 15 min. at room temperature, then placed in a 300° F. (149° C.) oven for 15 min. while maintaining the vacuum, after which it is allowed to cool to room temperature. The final laminate is visually free of bubbles and other defects. However, when pummel adhesion is measured on the finished laminate, a value of 9 is obtained which signifies too high adhesion representing a projected MBH of only about 12 ft (3.6 m). This fails the penetration resistance test (No. 26) of ANSI Z26.1-1990.

The preceding description is for illustration only and is not to be taken in a limited sense. Various modifications and alterations will be readily suggested to persons skilled in the art. It is intended, therefore, that the foregoing be considered as exemplary only and that the scope of the invention be ascertained from the following claims.

I claim:

1. In a no autoclave process for forming a safety laminate of two glass layers spacially separated by and bonded to a plasticized polyvinyl butyral sheet, the steps comprising allowing the water content of the sheet before bonding to exceed 0.2 weight percent, subjecting an unheated, unbonded assembly of the sheet between the glass layers to vacuum to remove air from between the glass layers and the sheet through a geometrically regular pattern of deairing grooves defined by collapsible projections on both surfaces of the sheet, heating the deaired assembly to a temperature sufficient to seal the edges of the glass layers and the sheet, and then reducing or discontinuing the vacuum during heating of the assembly for a time sufficient to bond the glass layers to the sheet to substantially avoid formation of water bubbles in the sheet and form the safety laminate.

2. The process of claim 1 wherein the water content of the plasticized polyvinyl butyral sheet in a) is about 0.4 to 0.6 weight percent.

3. The process of claim 1 wherein after removal of air the vacuum is progressively reduced in timed relation to increasing the temperature of the assembly during sealing of the edges of the components of the assembly.

* * * * *